R. HUFF.
RADIATOR SUPPORT FOR MOTOR VEHICLES.
APPLICATION FILED FEB. 7, 1910.

1,153,227.

Patented Sept. 14, 1915.
2 SHEETS—SHEET 1.

R. HUFF.
RADIATOR SUPPORT FOR MOTOR VEHICLES.
APPLICATION FILED FEB. 7, 1910.
1,153,227.
Patented Sept. 14, 1915.
2 SHEETS—SHEET 2.
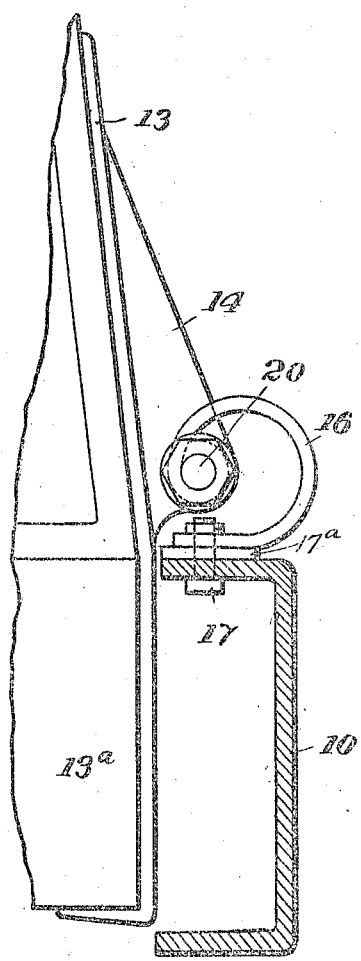
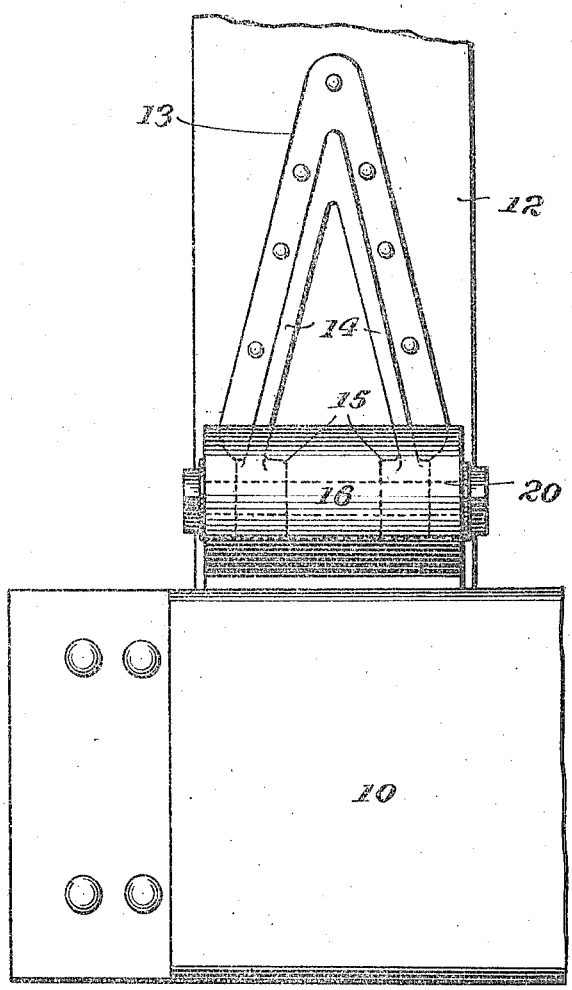

UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

RADIATOR-SUPPORT FOR MOTOR-VEHICLES.

1,153,227.

Specification of Letters Patent. Patented Sept. 14, 1915.

Application filed February 7, 1910. Serial No. 542,477.

*To all whom it may concern:*

Be it known that I, RUSSELL HUFF, a citizen of the United States, and resident of Detroit, county of Wayne, State of Michigan, have invented certain new and useful Improvements in Radiator-Supports for Motor-Vehicles, of which the following is a specification.

This invention relates to motor vehicles, and more particularly to means for supporting the radiator from the frame of the vehicle.

The object of this invention is to provide a simple and effective means for flexibly supporting the radiator from the frame of the vehicle.

The invention will be described in connection with the accompanying drawings, in which—

Figure 1:
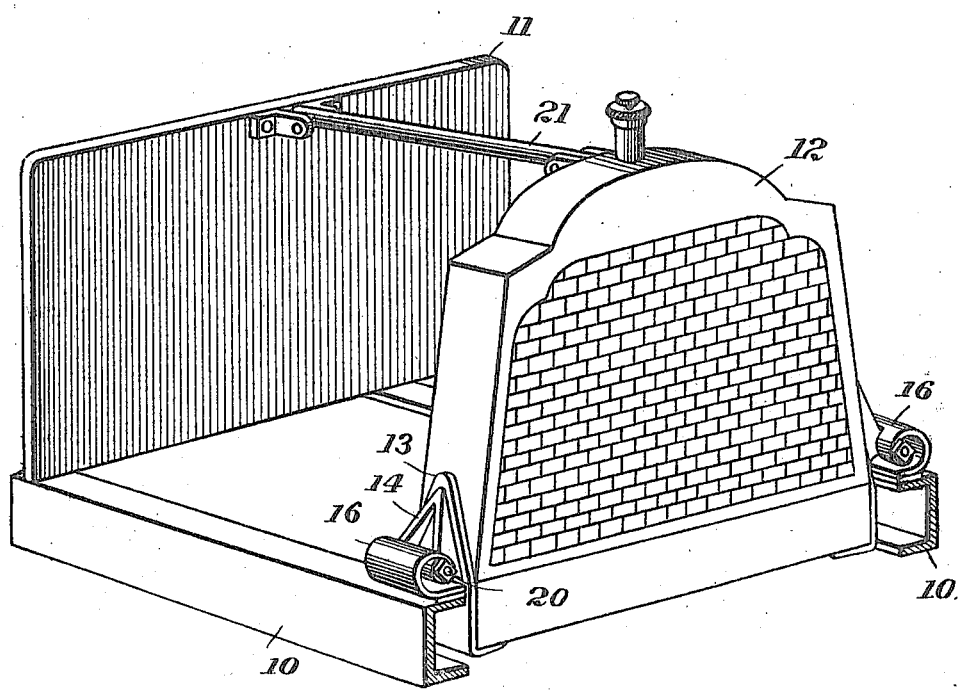
Figure 4:
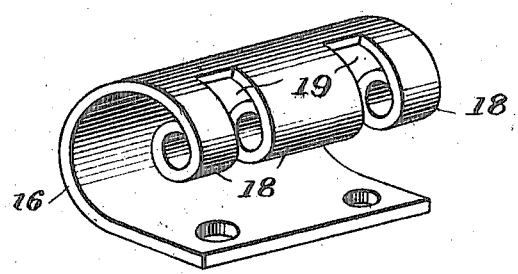

Figure 1 is a perspective view of the radiator and a portion of the motor vehicle to which it is attached; Fig. 2 is a partial front elevation, one of the side bars being shown in section; Fig. 3 is a partial side elevation; and Fig. 4 is a perspective view of the spring.

Referring to the drawings 10, 10 designate the side bars of a motor vehicle, 11 the dash and 12 the radiator.

The radiator has secured thereto, by rivets or other suitable fastening means, a pair of brackets 13. These brackets are provided with webs 14 which terminate in spaced perforated ears 15. A pair of C-shaped springs 16 are secured to the flanges of the side bars by means of bolts 17, strips of leather 17ª being interposed between the springs and flanges. The springs 16 have formed thereon perforated spaced ears 18, leaving recessed portions 19. The springs are secured to the radiator by means of headed bolts 20 which pass through the ears 15 and 18, the bolts being provided with nuts to keep them in place.

By means of the above construction the radiator will be flexibly supported from the side bars so that twisting strains, due to the movements of the frame, will not be transmitted to the radiator but will be taken up by the springs, and therefore the radiator will be relieved from jars which would tend to break its joints. It will be noted that the springs 16 are bowed outwardly and that the ears 18 are located at their inner ends. By means of this construction the outside of the structure is left smooth and clear, resulting in a neat appearance. The radiator is supported from the springs at a plurality of points along the side of the radiator, so that the radiator will tend to remain in an upright position. In order to further support the radiator a brace rod 21 connecting the radiator with the dash may be provided.

In the particular embodiment illustrated, the springs 16 are shown as C-shaped bowed-leaf springs and it will be noted that they are oppositely bowed and support the entire weight of the radiator.

Having thus described the invention, what is claimed is:

1. In a motor vehicle, the combination of a frame having separated side members, a radiator, and a connection between each of said side members and the radiator, each of said connections comprising a bowed leaf spring, a bracket, one of which parts is rigidly secured to the radiator and the other to the side member, and a bolt pivotally connecting the leaf spring and bracket and permitting relative movement therebetween, the springs being oppositely bowed and supporting the entire weight of the radiator.

2. In a motor vehicle, the combination of a frame having side members, a radiator, brackets on said radiator provided with ears, a plurality of C springs secured to said side bars and provided with ears, and bolts passing through the ears on said brackets and springs.

In testimony whereof I affix my signature in presence of two witnesses.

RUSSELL HUFF.

Witnesses:
MARY L. GILDEMEISTER.
DON B. HASTINGS.